United States Patent

[11] 3,622,695

[72] Inventor Robert H. Rugaber
Pittsford, N.Y.

[21] Appl. No. 765,511
[22] Filed Oct. 7, 1968
[45] Patented Nov. 23, 1971
[73] Assignee Xerox Corporation
Rochester, N.Y.

[54] FACSIMILE SYSTEM HAVING INCREMENTAL STEPPING PAPER DRIVE ASSEMBLY
12 Claims, 2 Drawing Figs.

[52] U.S. Cl. .......... 178/6, 178/DIG. 3, 178/DIG. 27, 178/7.1
[51] Int. Cl. .......... H04n 3/30, H04n 7/12
[50] Field of Search .......... 178/DIG. 3, 6, 7.1, 6.8, DIG. 27

[56] References Cited

UNITED STATES PATENTS

| | | | |
|---|---|---|---|
| 2,909,601 | 10/1959 | Fleckenstein | 178/DIG. 3 |
| 3,344,231 | 9/1967 | Dodd | 178/DIG. 3 |
| 3,472,953 | 10/1969 | Montevecchio | 178/6.8 |
| 3,483,317 | 12/1969 | De Groat | 178/6 |
| 3,499,975 | 3/1970 | Arps | 178/6.8 |

*Primary Examiner*—Robert L. Griffin
*Assistant Examiner*—Joseph A. Orsino, Jr.
*Attorneys*—John E. Beck and Franklyn C. Weiss

ABSTRACT: A facsimile communication system including an incremental stepping paper drive assembly for advancing a document or the like past a scanning station. In combination with a binary digit encoder and buffer storage unit, the incremental stepping paper drive assembly is activated and interrupted in accordance with the amount of information detected, encoded and stored in order to maintain maximum information transmission over a limited bandwidth transmission medium.

INVENTOR.
ROBERT H. RUGABER

BY Franklyn C. Weiss

ATTORNEY

FACSIMILE SYSTEM HAVING INCREMENTAL STEPPING PAPER DRIVE ASSEMBLY

BACKGROUND

In prior art facsimile systems, documents to be transmitted are scanned at a transmitting station to convert information on the document into a series of electrical signals. These video signals are then coupled to the input of the communication link interconnecting a transmitter with a receiver. At a receiving station, video signals, in conjunction with suitable synchronizing signals, selectively control the actuation of appropriate marking means to generate a facsimile of the document transmitted.

In such a facsimile system, quick and accurate service, as well as low-cost operation, is desirable. To achieve low cost but rapid transmission service has been, in the past, difficult as the system required a large bandwidth capability transmission medium in order to maintain picture resolution and signal quality at a high level. The main drawback, therefore, to such prior art devices has been the prohibitively high rental cost of the use of the transmission medium used to transmit the large signal densities. Without the use of the high-capacity transmission medium, the document transmission time increases or, alternatively, the number of documents per unit time transmitted decreases, accordingly. It is apparent, therefore, that the high cost of such transmission line service, or increase in document transmission time, becomes a serious limitation on the economic usefulness of the facsimile equipment.

It is, accordingly, apparent that with the high cost of the transmission medium, that such transmission medium be used at its maximum bandwidth capability in order to maintain a high overall system efficiency. Inasmuch as document complexity differs from document to document, the online or direct transmission of the information as detected on the document would not utilize the transmission medium to its fullest capabilities as documents contain a large amount of redundant or background information. To overcome these difficulties, prior art facsimile systems have included bandwidth compression or encoding techniques to reduce such information to coded digital words to decrease the amount of actual binary digits necessary for transmission. Even with such bandwidth compression techniques, however, the transmission medium may still not be used to its fullest capacity in that different scan lines on a document would compress, or encode, differently as such lines contain different amounts of information. For instance, one particular scan line could contain an inordinately high amount of information as a scan through a typewritten line, while another scan may contain little or no information as between lines or paragraphs and at the top or bottom of a typical document.

One prior art technique of overcoming the above difficulties is the use of a controlled cathode ray tube beam used for scanning in a facsimile system and counting the encoded words prior to loading a buffer storage unit. See U.S. Pat. No. 3,344,231, issued Sept. 26, 1967. The use of cathode ray tubes as facsimile scanning devices necessarily implies a high volume and attendant high-cost facsimile communication system. The use of a cathode ray tube with its high scan rate capabilities may be justified in a high-cost, high-volume system where the revenue obtained due to such high volume overcomes the initial cost of the tube. In addition, the use of cathode ray tubes do not lend themselves to use in facsimile transceivers wherein a unit would be capable of both transmitting and receiving in its associated modes. In a low-cost system, wherein the transmission medium may be an ordinary common carrier telephone line, cathode ray tubes and associated deflection and power circuitry could not be economically justified.

OBJECTS OF THE INVENTION

It is, accordingly, an object of the present invention to optimize the information handling capability in a facsimile communication system.

It is another object of the present invention to maximize the information transmission capability required of a transmission medium in a facsimile communication system.

It is another object of the present invention to control the document speed past a scanning station in a low-cost facsimile system.

It is another object of the present invention to provide a coordinated scanner, paper feed, and buffer storage unit in a facsimile communication system to optimize the information transmission rate therein.

It is another object of the present invention to provide synchronization between scanning and storing of facsimile information for both transmitting and receiving in a facsimile communication transceiver.

BRIEF SUMMARY OF THE INVENTION

In accomplishing the above and other desired aspects, Applicant has invented novel methods and apparatus for controlling the scan operation in accordance with transmitted or received binary information in a facsimile communication system. A stepping paper drive assembly is utilized for advancing a document or copy paper through a scan area of a facsimile transceiver. The document moves at incremental steps past the scan station for optically scanning and printing in the transmit or receive modes respectively.

The video signals detected by a photodetection apparatus in the scanner are converted to digital information and transferred to a bandwidth compression unit or encoder for reducing the redundancy in the digital wavetrain. The encoded binary information is then fed into a buffer storage unit which is used to temporarily store the video information prior to transmission. In order to optimize the transmission of the video information and to approach the bandwidth capability of the transmission medium itself, the buffer storage unit unloads the video information at the rate compatible with the bandwidth of the transmission medium. Inasmuch as lines on a document compress to different amounts, the information into the buffer may approach the limit of the storage therein. In this instance, the stepping paper feed is interrupted, rather than interrupting the scanning operation, and no more information is encoded and transferred to the buffer storage unit until monitoring circuits detect that the buffer can receive more information. At this time the stepping paper feed is actuated and the scanning, encoding, and storing operations continue. This operation works in the receive mode also inasmuch as the apparatus is intended for a transceiver unit which allows for transmitting and receiving with the use of the same apparatus. Thus, in the transmit mode, when the buffer storage unit is receiving information at a rate which loads the buffer to its maximum limit, the scanning operation is interrupted until the buffer unloads the information to allow more input information to be stored therein. In the receive mode, loading is not interrupted but unloading is interrupted until sufficient information is in storage to allow printing of a line.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
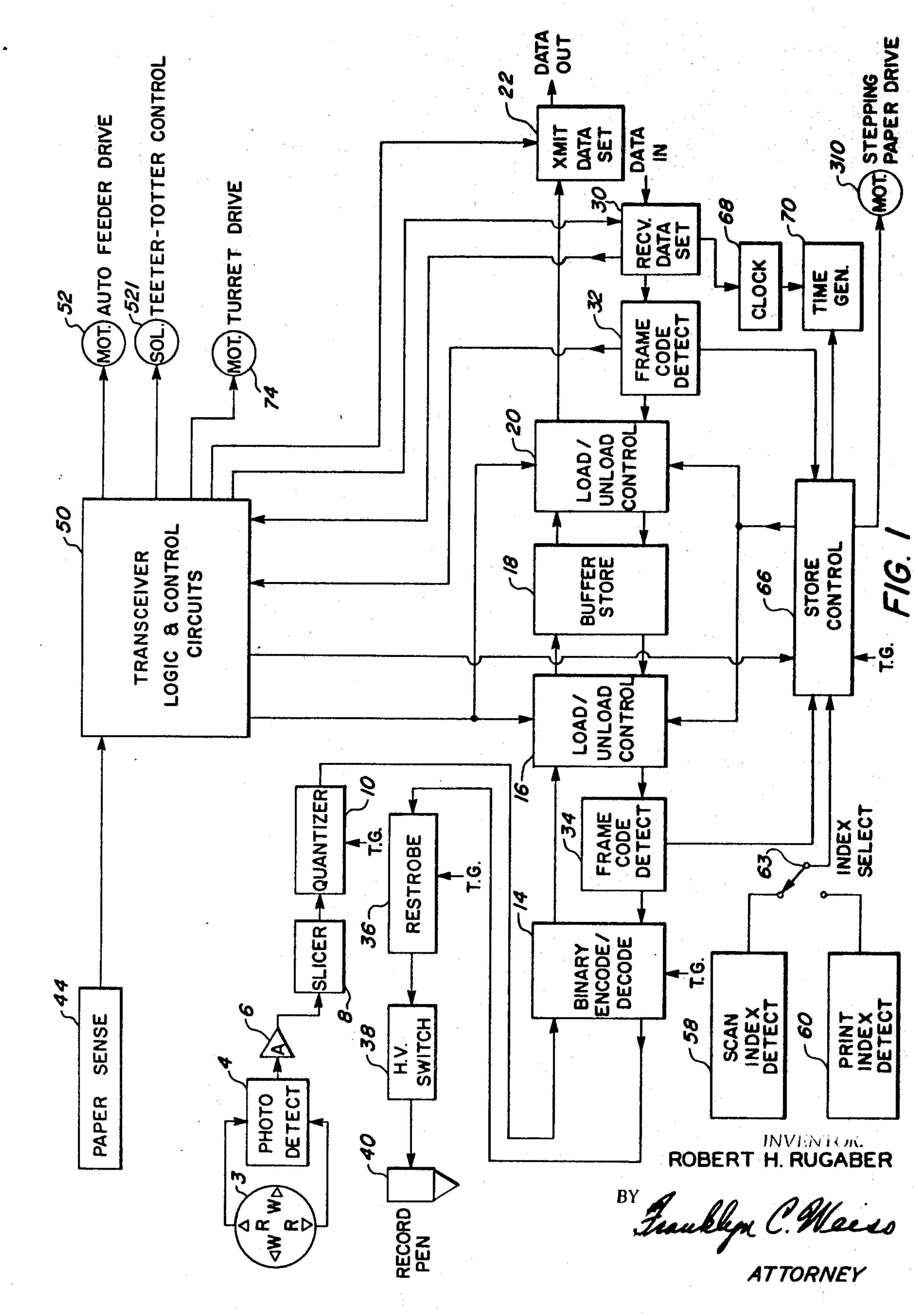
FIG. 1 is a block diagram of the electrical apparatus included in the facsimile transceiver employing the principles of the present invention.

Referring now to FIG. 1, there is shown a block diagram of a facsimile transceiver utilizing the principles of the present invention essentially as set forth in copending application No. 572,493, now abandoned, assigned to the same assignee as the present application. The electrical aspect of the facsimile transceiver in the copending and present application is fully set forth in application Ser. No. 572,493. However, for full understanding of the invention set forth in the present application, certain aspects of the electrical operation of the facsimile transceiver will be described in order to more fully understand the present invention.

A transceiver may be defined as the combination of facsimile transmitting and receiving equipment in a common housing, and employing common components for both transmitting and receiving, certain components being utilized both in a transmit mode and receiving mode. That is, when in this specification the discussion alludes to transmit and receive transceivers, it will be seen that similar transceivers are being utilized, with one in the transmit mode and the other in the receive mode.

In the prior art facsimile systems, a document was advanced past a scanning station by rollers or other feeding devices. In the present application stepping paper drive motor 310 is utilized to step the document past the scanning station 3. While many scanners are available in the art, a turret type of scanner is preferred, driven by turret drive motor 74 wherein two optical read heads are provided 180° apart on a rotating disc or the like. For printing purposes in the transceiver, two write heads are also provided on the same rotating disc with 180° separation, placed in 90° relationship with the two read heads. The derived information modulated light beam is converted to electrical signals by photodetector 4, of conventional design. The electrical signals derived therefrom are then amplified at video amplifier 6 for application to slicer 8. The slicer 8, which may be a conventional Schmitt trigger, compares the electrical signals with a known electrical potential to convert the electrical signals into discrete signal levels indicating black or white information detected on the document. The derived sliced electrical signals are then applied to quantizer 10, of conventional design, to bring these signals into a time relation with a clock signal provided by time generator 70. The output signals from quantizer 10 are now binary signals quantized into time relation for further circuit operation. The time generator 70 is responsive to clock source 68, both of conventional design, and supplies the various clock pulses required for a synchronous operation of the circuit.

A principle application of facsimile equipment is the transmission of printed or typewritten documents or letters. It is a distinguishing characteristic of such original documents that printing or typing is arranged in substantially horizontal lines. Examination of a typical letter, for example, will show that lines of typing actually occupy considerably less than half the vertical dimension of the letter, the rest of its dimension being blank and corresponding to spaces between lines as well as blank spaces at the top and bottom of the letter. Such signal inefficiency inherent in facsimile output waveforms, due to the fact that the waveform comprises two-level binary information and the attendant long periods of little or no information transmission, have lead to the development of various encoding techniques to reduce such inefficiency, thereby eliminating the wasted transmission time.

There is provided, therefore, a bandwidth compression circuit 14 for encoding the detected facsimile waveform. Binary encoder-decoder 14 is utilized for encoding and decoding the binary information when in the transmit or receive mode, respectively. The input to the encoder in the transmit mode is the quantized binary video signal representing black and white areas of information on the original document. The binary waveform is encoded to improve the efficiency by the generation of code words representative of the lengths of black or data, and white or background redundant information. One such encoding technique is known as run length encoding in which binary numbers corresponding to the length of blocks of binary data are transmitted rather than the usual binary data signals. In such a system, a binary number of relatively few binary digits may be sent in lieu of a larger block of video binary data. For a more complete understanding of run length encoding, reference is made to U.S. Pat. No. 3,035,121 to W. F. Schrieber, issued May 15, 1962.

The binary video information is received at the encoder 14 from the scanning and digitizing circuits at a rate higher than the transmission capability of the communication channel. Such an increased scan rate is due to the fact that the purpose of the bandwidth compression circuit is to reduce the inherent redundancy of pictorial material without the loss of information, and to transmit the resultant encoded data with a substantial reduction in required bandwidth time product. Since the bandwidth of the channels under consideration is restricted, increasing the efficiency of the data decreases the time of transmission. In order to optimize the bandwidth transmission capability of the channel, therefore, the information should be transmitted at a rate approaching its bandwidth capability. As no two documents to be scanned are alike, the time for transmission and associated binary digit transmission rate can only be approximated within a certain error percentage.

Load-unload control 16 will receive the encoded binary information from encoder 14 and will transfer such information to the buffer storage unit 18. As the load-unload control 20 is unloading the buffer storage unit 18 at the transmission rate, at times the scan information will be reaching the buffer store 18 at too fast an input rate. In this instance, therefore, the load-unload control 16, in a manner to be more fully hereinafter described, will emit a signal to interrupt the scanner operation until the buffer store 18 is sufficiently devoid of information to allow further scanning.

Transmitted along with the encoded binary information is a unique sync word to delineate the separate scan lines. A sync word is unique in the sense that the particular combination of binary digits comprising such a sync word could not, by definition, appear in the output encoded waveform. Such a sync word is inserted into the information wave stream at the load-unload control 20 by means of the scan index detector 58. Such a scan detector could be any of the known scan detection devices, which for example, could comprise a photoelectrical cell, not shown, adjacently disposed to the scan road turret arrangement. A similar print index detector 60, also not shown, is provided for the receive mode, being selected by index selector 63. The derived signal therefrom would then be applied to store control 66, the operation of which will be more fully hereinafter described.

After the encoding and storing operations, the encoded waveform must be prepared for transmission to a similar transceiver unit at the remote location. Therefore, at the input and output ends of the transmission medium are circuits for providing compatibility between the transmitter and receiver circuits and the transmission medium. These circuits, commonly called data sets, provide impedance matching and power amplification and/or modulating apparatus. Such data sets may, for example, comprise a conventional line driver, radio transmission unit, and the like. As fully set forth in copending application No. 572,493, acoustic coupling may be utilized for mobility and simplicity in the use of a conventional telephone handset. It is, of course, possible to utilize direct electronic coupling to the transmission medium.

In the receive mode, the two-level binary signals derived from the receiver data set 30 are then applied to the frame code detector 32. This unit it utilized to detect the unique sync word that was inserted in the binary wave train at the transmitting transceiver. Upon detection of the sync word, the store control 66, which is essentially a counter, is energized and advanced one count. Such a frame code detector 32 may comprise logical flip-flop circuitry which is wired to detect the particular configuration of the unique sync word utilized. The output information from the frame code detector 32 is then passed onto load-unload control 20 which, as described in conjunction with the transmit function of the transceiver, is used to load the buffer store 18 with the binary encoded information. Load-unload control 16 draws the information from the buffer store 18 at a rate to be utilized by the output printer unit. As the information is unloaded from the buffer store through the load-unload control 16, another frame code detector 34 will detect the same unique sync word as was detected at frame code detector 32.

Upon detection of the sync word at 34, a signal is used to count down the store control 66. The counting-up and counting-down operation is utilized so that the store control 66 will be able to detect the number of lines stored at the buffer store 18. That is, for example, if three lines of information have been stored at the buffer store 18, frame code detector 32 would have detected three sync words. Thus, store control 66 would have been advanced three counts, one for each of the detected input sync words. As the information is unloaded from the store, frame code detector 34 emits a signal to count down the store control 66 such that the first line output would indicate that two lines of information remain stored in the buffer store 18. As was hereinbefore set forth, the stepping paper drive motor 310 is energized by the condition indicated at the store control 66 to advance the document paper through the transceiver.

After buffer storage, the binary encoded information is directed to the binary decoder 14. This decoder, in a manner similar to the encoder operation described for the transmit mode, reconstructs the signal waveform with its associated redundancy.

A restrobe unit 36 is provided to retime the output binary information to a condition that can be applied to an output printer. If, for example, an electrographic printer is utilized, the output from the restrobe unit 36 is used to energize a high-voltage switch 38, of conventional design, operating at a predetermined operating potential. The output from the high-voltage switch 38 is coupled to the recording pen on the rotating turret 3, indicated as the write heads. As the turret revolves and scans across the copy or record paper, the high-voltage potential is selectively applied to form an invisible or latent electrographic image on the output paper document. As the recording medium passes by the write station, prior art xerographic toner and developer may be used to develop the image on the recording medium which is then fused for permanent retention of the facsimile document. A facsimile of the original document would now be available in an output tray or the like for viewing and inspection.

Additionally coupled to the transceiver logic and control circuit 50 are the paper sense units 44, the automatic paper feeder drive 52, the teeter-totter control 521, necessary for the operation of the present invention. Thus, in a manner more fully described in copending application Ser. No. 765,538 in conjunction with the actual mechanical stepping paper drive apparatus, the paper sense units sense the position of the document or copy paper throughout the unit by means of microswitches or photoelectric cells, for example. The paper sense units therefore, monitor the path of document or copy paper movement throughout the transceiver and energize accordingly the proper apparatus for correct synchronization and machine apparatus operation. Thus, for example, upon proper paper sense information, the automatic feeder drive moves an original document or copy paper, in the transmit or receive modes respectively, into the scan area. Once the document or copy paper is in the scanning area, stepping paper drive 310 in conjunction with the operation of teeter-totter control 521 steps the document or copy paper through the scan area and past the turret 3, which is controlled by turret drive motor 74. After the document is past the scan area, motor drive 360 is energized and moves the document quickly away from the scan area.

It is noted, in FIG. 1, that the drive motors are under control of the transceiver logic and control circuit 50, with the exception of stepping paper drive 310. Thus, in the transmit mode, as the original document is scanned, the information is encoded by encoder 14 and by load-unload control 16 is stored in buffer store 18. Since the transmitting medium can only handle a predetermined maximum amount of binary information before distortion occurs, the encoded information for particular scan or scans might be reaching the buffer store 18 at a rate too fast to allow for sufficient transmission time. To state it in another way, the encoded information might be loading the buffer store 18 faster than the transmitter data set 22 through load-unload control 20 is unloading the buffer store 18 for transmission. In this instance, therefore, store control 66 by monitoring the amount of information in the buffer store 18 interrupts the operation of stepping paper drive motor 310 thereby halting the paper movement through the scan area. Since the turret 3 has a high inertia, it is allowed to maintain its rotation speed, the transceiver logic and control circuit 50 indicating to the electronic digital circuits to ignore the information being generated by the photodetector 4 until the store detector 66 through drive motor 310 allows the paper drive through the scan area to commence once again.

In the receive mode, in a similar manner, store control 66 controls the stepping paper drive motor 310 as the document proceeds past the scan area in the write mode. Thus, if the received information is complex and a longer time is necessary for decoding the information, the turret 3 will be caused to continually scan one line with no writing taking place, as stepping drive motor 310 is deenergized until store control 66 indicates that buffer store 18 can provide more information. In this way, in both the transmitting and receiving modes, the system is fully adaptive in that no information is lost due to the fact that the electronics involved, with a possible complex document, will not lose any information due to the operation speed of the system. Document integrity is therefore preserved, thereby allowing a more accurate and readable output facsimile document.

Figure 2:
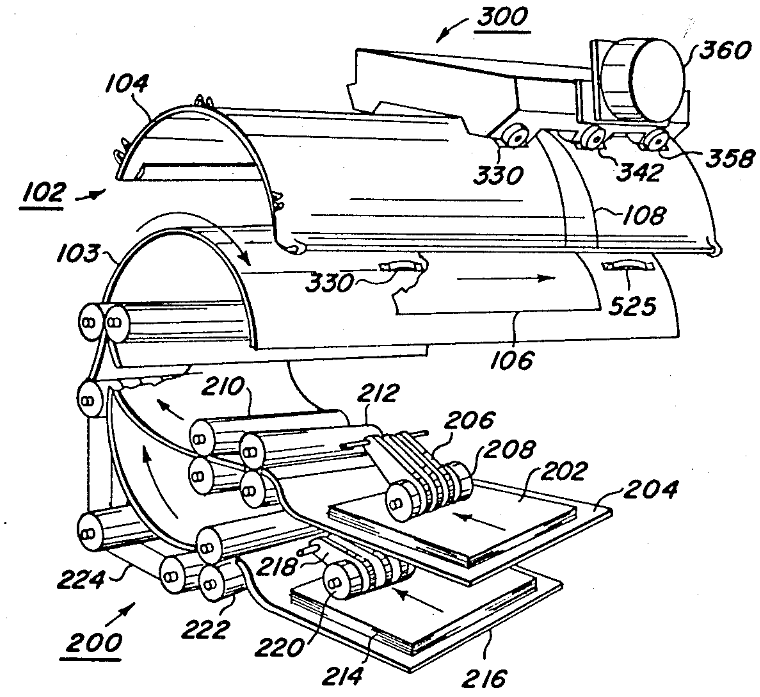
FIG. 2 is an isometric drawing showing the automatic document feeder, platen assembly and incremental stepping paper drive of the facsimile transceiver.

In FIG. 2 is shown the automatic document feeder drive assembly 200, the stepping paper drive assembly 300, and the input document curved platen assembly 102. The mechanical aspects of the invention disclosed in FIG. 2, in conjunction with the electrical system described in conjunction with FIG. 1, perform the substance of the present invention in the advancing and stepping of a document or copy paper through a scan area. Subsequent paper unloading, developing and paper feedout apparatus is not shown in the present invention in that it is a basis of another copending application, Ser. No. 758,932, assigned to the same assignee. In particular, FIG. 2 shows a stack of original documents 202 resting on an input tray 204. Upon proper command from the transceiver logic and control circuit 50, seen in FIG. 1, the paper-feeding assembly 206 grips a document by rollers 208 and begins to feed a document at a time through roller assemblies 210 and 212 into the platen assembly 102. In a similar manner, in the receive mode, a blank sheet of record or copy paper in a stack 214 on tray 216 is advanced by paper drive assembly 218 by the advancing of the wheels 220 mounted thereon by feeding the paper through roller assembly 222 into the platen assembly 102. Seen in the figure are belt drives 224 which hold the paper against the tray 216 as the copy paper is advanced up into the platen area. For a more complete understanding of the automatic document feeder, reference is made to copending application Ser. No. 711,547, now U.S. Pat. No. 3,524,659, assigned to the same assignee.

The automatic document feeder assembly 200 is shown to advance the document or copy paper into the platen area from a direction perpendicular to the longitudinal axis of the curved platen assembly 102. It is apparent, however, that an original or record document could be advanced from a direction along the axis of the platen 102 by a paper drive assembly along the axis thereof. The automatic feeder drive assembly 200 is, therefore, exemplary only as any paper feeder assembly, which would drive a document or record member onto the platen area, could be utilized without deviating from the principles of the present invention.

Platen 103 and platen 104 are shown apart for ease of illustration and description, but it is obvious that during the operation of the apparatus, these platens would be in close proximity to each other to effect accurate and rapid movement of the document through the scan area. Mounted on the top platen 104, is the stepping paper drive assembly 300. While the operation of the paper drive 300 is more fully hereinafter described, it can be seen that driving wheels 330, 342, and 358, extend through the platen 104 to come in contact with associated idler wheels. The associated idler wheel for drive wheels 330 and 342 are not seen in FIG. 2, as a document 106 is seen to be advancing through the scan area designated at 108. The idler wheel which operates in conjunction with drive wheel 330 is mounted on a teeter-totter assembly which is more fully described in conjunction with said copending U.S. application Ser. No. 765,538, and is withdrawn below the level of platen 103 when the document is advanced onto the platen area from the automatic paper feeder drive assembly 200. As soon as the document reaches the full position on platen 103 the teeter-totter assembly is energized and the wheel 330 rises through the opening in plate 103 thereby gripping the document by pressure against the upper platen 104 to drive the document longitudinally through the scan area. In other words, the paper feeder drive as shown in FIG. 2, automatically feeds a document or copy paper onto the platen area in a direction transverse to the axis of the platen assembly. After the document is detected to be in the proper position, the teeter-totter assembly is activated and the drive wheels associated therewith change the direction of movement of the document longitudinally along the axis of the platen 103. While FIG. 2 has been described with one set of drive wheels and associated idler wheels, it can be seen in FIGS. 3 and 6 that another set of drive and idler wheels operate on the other side of the curved platen.

After the document has passed the scan area 108 the drive wheel 358 and associated idler wheel 525 drive the document away from the scan area at a higher rate of speed than the stepping drive through the scan area. As set forth above, subsequent paper operations after it passes the scan area are not shown in the present application but it is the basis of copending U.S. application Ser. No. 758,932.

If, as set forth in conjunction with FIG. 1, the buffer, in the transmit or receive mode, is receiving information at a rate higher than it can handle, the stepping action is interrupted accordingly Scanner rotation would continually take place, however, but the control circuit would prevent the subsequent video or print circuitry seen in FIG. 1 from operating in accordance with the detected or received information.

In the foregoing there have been disclosed methods and apparatus for incrementally stepping a document or record member in a buffer controlled scan facsimile transceiver system. A transceiver unit has been shown and described, however, it is apparent that separate transmitters and receivers may be utilized in conjunction with the present invention. Moreover while the invention has been described with reference to specific embodiments, it will be understood by those skilled in the art that various changes may be made and equivalents may be substituted for elements thereof without departing from the true spirit and scope of the invention. In addition, many modifications may be made to adapt a particular situation to the teaching of the invention without departing from its essential teachings.

What is claimed is:

1. A facsimile system for transmitting video signals representative of information on a document or the like comprising scanning means for generating said video signals on successive parallel line paths on said document, incremental drive means for stepping said document past said scanning means, encoding means coupled to said scanning means for generating binary code signals representative of the data and redundant background information on said document, buffer storage means coupled to said encoding means for temporarily storing said binary code signals prior to transmission thereof, means coupled to said buffer storage means for interrupting said incremental drive means at periods when said buffer storage means approaches the limit of storage therein, and means further coupled to said interrupting means for interrupting the storing of said video signals upon said interruption of said incremental drive means.

2. The system as set forth in claim 1 wherein said interrupting means comprises loading control means for loading said buffer storage means at the scan rate and unloading said buffer storage means at the transmission rate, store control means coupled to said loading control means for monitoring the number of scan lines of information stored in said buffer storage means, said store control means interrupting said incremental drive means when said buffer storage means is unable to accept another full line of said binary code signals.

3. The system as set forth in claim 2 further including sync-word-generating means for inserting a unique binary sync word after each scan line into the binary code signals, said store control means further including counting means for counting the number of said sync words in said buffer storage means.

4. A facsimile transceiver system comprising scanning means for generating and printing in a transmit and receive mode, respectively, video signals representative of information on a document or the like, incremental drive means for stepping said document past said scanning means, said scanning means thereby scanning successive parallel line paths on said document, circuit means coupled to said scanning means for encoding and decoding in said transmit and receive modes, respectively, binary code signals representative of the data and redundant background information on said document, buffer storage means for temporarily storing said binary code signals prior to transmission in the transmit mode and after transmission in the receive mode, respectively, and means coupled to said buffer storage means for interrupting said incremental drive means at periods when said buffer storage means approaches the limit of storage therein.

5. The system as set forth in claim 4 wherein said interrupting means comprises loading control means for loading said buffer storage means at the scan rate and unloading said buffer storage means at the transmission rate in the transmit mode, and for loading said buffer storage means at the transmission rate and unloading said buffer storage means at the scan rate in the receive mode, and store control means coupled to said loading control means for monitoring the number of scan lines of information stored in said buffer storage means.

6. The system as set forth in claim 5 further including sync-word-generating means for inserting a unique binary sync word after each scan line into the binary code signals in the transmit mode, sync-word-detecting means for detecting a unique binary sync word for each scan line from said binary code signals in the receive mode, said store control means further including counting means for counting the number of said sync words in said buffer storage means.

7. A method of transmitting graphic information comprising generating video signals representative of information on a document or the like scanned on successive parallel line paths, stepping said document past the scan area, encoding said video signals into binary code signals representative of the data and redundant background information on said document, temporarily storing said binary code signals in a buffer store prior to transmission thereof, interrupting the stepping of said document when said buffer store approaches the limit of storage of said binary code signals therein, and further interrupting the encoding and storing of said video signals upon said interrupting of said stepping.

8. The method as set forth in claim 7 further including loading said buffer store at the rate of scanning, unloading said buffer store at the rate of transmitting, monitoring the number of scan lines of information stored in said buffer store, said step of interrupting the stepping of said document occurring when said buffer store is unable to accept binary code signals representative of a full scan line.

9. The system as set forth in claim 8 further including inserting a unique binary sync word into the binary code signals after each line of scan, said step of monitoring including counting the number of said sync words in said buffer storage means.

10. A method of receiving graphic information comprising temporarily storing binary code signals representative of the data and redundant background information on a document or the like in a buffer store, decoding said binary code signals into video signals for producing a facsimile of said document or the like, printing on successive parallel line paths on a record member marks in response to said video signals, stepping said record member past the printing area, interrupting the stepping of said record member when said buffer store approaches the limit of storage of said binary code signals therein.

11. The method as set forth in claim 10 further including loading said buffer store at the rate of receiving, unloading said buffer store at the rate of printing, and monitoring the number of scan lines of information stored in said buffer store.

12. The system as set forth in claim 11 further including detecting a unique sync word for each line of scan in said binary code words, said step of monitoring including counting the number of said sync words in said buffer store.

* * * * *